May 17, 1960  A. C. SAMPIETRO  2,937,218
THERMAL ELECTROMOTIVE FORCE GENERATOR
Filed June 27, 1958
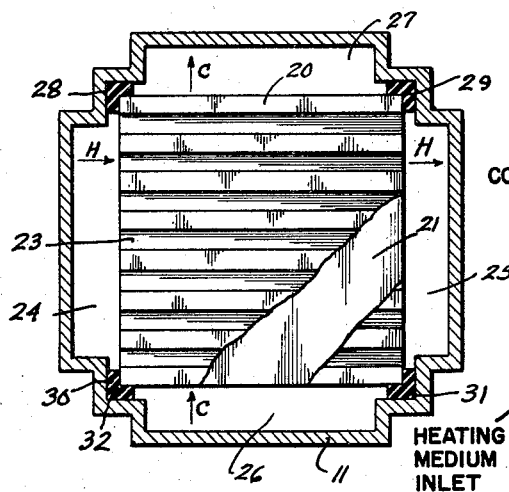
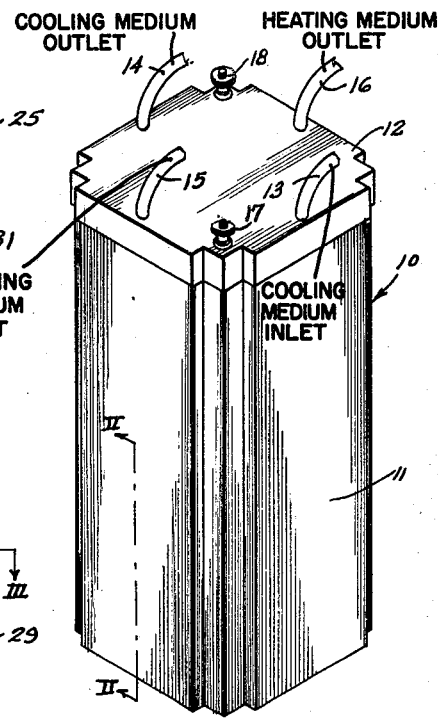
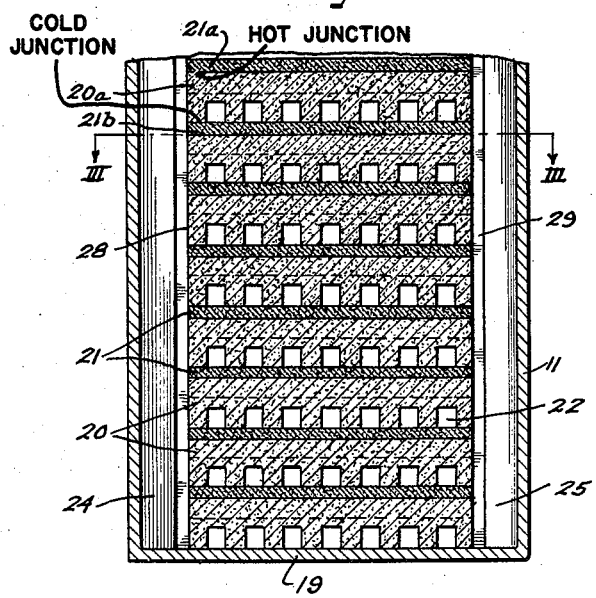
Inventor
Achilles C. Sampietro

United States Patent Office 2,937,218
Patented May 17, 1960

2,937,218

THERMAL ELECTROMOTIVE FORCE GENERATOR

Achilles C. Sampietro, Detroit, Mich., assignor to Thompson Ramo Wooldridge Inc., a corporation of Ohio Application June 27, 1958, Serial No. 745,132

7 Claims. (Cl. 136—4)

This invention relates to a thermal electromotive force generator. More particularly, this invention relates to means for generating electrical power from thermal energy by utilizing the "Peltier" effect wherein an electrical circuit containing two junctions of different electrically conductive materials maintained at different temperatures gives rise to an electromotive force. In particular, the invention relates to the use of materials that give relatively high difference of potential for a moderate temperature difference between the hot and cold junctions and to the construction of these materials in a device the structure of which affords optimum economy and efficiency.

It is an object of this invention to provide a thermal electromotive force generator.

It is a further object of this invention to provide a thermal electromotive force generator which is compact and economical in construction and highly efficient in operation.

It is a further object of this invention to provide a thermal electromotive force generator in which the heat exchange channels maintaining the temperature difference of the junctions are integrally formed in the electrically conductive materials comprising the generator.

It is a still further object of this invention to provide a thermal electromotive force generator the individual cells or units of which may readily be connected either in electrical series or parallel relationship.

While the novel and distinctive features of the invention are particularly pointed out in the appended claims, a more expository treatment of the invention, in principle and in detail, together with additional objects and advantages thereof, is afforded by the following description and accompanying drawings in which like reference characters are used to refer to like parts throughout and wherein:

Figure 1 is a perspective view of a thermal electromotive force generator in accordance with the present invention.

Figure 2 is a vertical sectional view taken on the line II—II of Figure 1.

Figure 3 is a sectional view with certain parts broken away taken on the line III—III of Figure 2.

The general physical principles of thermo-electricity and the phenomenon of thermal electromotive force generation have been well-known for some time. These general physical principles are, for example, discussed at pages 218 through 226 of a book entitled "Principles of Electricity," by L. Page and N. I. Adams, published by D. Van Nostrand Co., Inc., New York, New York, tenth printing 1944. These physical principles have been most commonly used in thermocouples used to measure temperature rather than to generate useful electric power. Many attempts have, however, been made to construct thermoelectric batteries or generators which would be sufficiently economical to construct and sufficiently efficient in generating useful quantities of electric power to be commercially practical. It is apparent that a commercially practicable thermal electromotive force generator must be both simple and rugged in construction and capable of producing a reasonable voltage output In Figures 1, 2 and 3, there is shown a thermal electromotive force generator consisting of a stack of members or plates, intermediate ones of which are of one type of electrically conductive material and alternate ones are of a second type of such material. By way of example there is listed below the voltage output for each unit of the stack using the stated combinations of materials and maintaining a temperature difference of 300° C. between the two junctions of each unit:

|  | Volt |
|---|---|
| Silicon–germanium | .20189 |
| Silicon–antimony | .12553 |
| Silicon–iron | .11512 |
| Silicon–chromel | .11941 |

Other suitable combinations of materials may, of course, also be found by those skilled in the art.

In Figure 1 there is shown a thermal electromotive force generator 10 comprising a generally rectangular case 11 and a removable top 12 therefor. Case 11 and top 12 are preferably composed of any suitable electrical and heat insulating material such as a ceramic or a plastic. Cover 12 is provided with an inlet pipe 13 and an outlet pipe 14 for any suitable heating medium. Cover 12 is further provided with an inlet pipe 15 and an outlet pipe 16 for any suitable cooling medium. Cover 12 is also provided with means to derive an electrical output from the generator such as the terminal or binding posts 17 and 18.

As may best be seen in Figures 2 and 3, the container 11 is provided with a bottom wall 19 which is integral with the side walls thereof and is composed of the same material. Within the container 11 there is positioned a plurality of members or generally rectangular plates 20 of a first electrically conductive material and a further plurality of members or generally rectangular plates 21 composed of a second electrically conductive material different from the material of plates 20. It will be noted that the plates 20 and 21 all have generally the same outline shape so that they may readily be stacked in a unitary pile as shown in Figure 2. It will, of course, be understood that although the plates are shown in the preferred embodiment of Figures 1, 2 and 3 as being generally rectangular, other shapes could also be used. The overall configuration could, for example, be circular rather than rectangular. The rectangular configuration is convenient in that it provides a four sided stack on each side of which there is formed a chamber for the circulation of a heat exchange medium as will be described in detail below.

Plates 20 and 21 may be composed of any known electrical conductor or semi-conductor, that is to say, of any suitable electrically conductive materials the junctions of which may be utilized to generate thermal electricity. By way of example, any combination of the materials listed above may suitably be used. Thus, plates 20 may suitably be silicon whereas plates 21 may suitably be germanium. Each plate 20 is provided with a plurality of recessed channels 22 cut or recessed into one major surface thereof. Plates 20 are each further provided with a second plurality of similarly recessed channels 23 cut in the opposite major surface thereof. Channels 22 are preferably cut to extend in generally parallel relationship with one side or edge of plate 20 and channels 23 in the opposite major surface of plate 20 are preferably cut to extend substantially perpendicularly to the channels 22. The plate 20 in which these recesses or channels are cut should preferably consist of the cheaper of the two materials used. Plates 21 are plain surfaced flat rectangular plates so that when the plates 20 and 21 are arranged alternately in sandwiched or stacked relation as shown in Figure 2, the two alternate plates 21 adjacent to any given intermediate plate 20 will respectively make electrical contact with opposite surfaces or sides of the intermediate plate 20 to thereby form first and second junctions therewith. The alternate plates 21 also serve to provide the fourth side for the channels or recesses 22 and 23, that is to say, they serve to close the cross sectional perimeter of these channels to provide conduits for the flow of a heat exchange medium.

It is thus seen that one intermediate plate, such as the plate 20a, and two alternate plates, such as the plates 21a and 21b, provide a first junction as at the interface between plate 21a and plate 20a and a second junction, as at the interface between plates 20a and 21b, and thereby constitute one unit or one thermal pile of the thermal electromotive force generator. Each of these units for any given material combination will provide a voltage output as given by way of specific examples above. Furthermore, each of these units is provided as an integral part thereof with channels for the flow of heat exchange media to control the temperature at each of the two junctions. Thus, a heating medium may be circulated through the channel 23 in the general direction of the arrows H shown in Figure 3 to maintain the junction formed at the interface between plates such as the plates 21a and 20a at a relatively high temperature whereas a cooling medium may be circulated through the channels 22 in the general direction indicated by the arrows C in Figure 3 to maintain the junction formed at the interface between such plates as plates 20a and 21b at a relatively low temperature.

The heating medium may conveniently flow from headers or reservoirs 24 and 25 formed on opposite sides of the case 11 by projections in the side wall thereof and connecting at the top with inlet and outlet pipes 15 and 16. Similarly, the cooling medium may conveniently flow through channels 22 from headers or reservoirs 26 and 27 similarly formed by projections in the other opposite pair of sides of the case 11 and connecting in open communication at the tops with inlet and outlet pipes 13 and 14. The stack of plates 20 and 21 may conveniently be mounted in case 11 by means of insulating support members 28, 29, 30 and 31, positioned as shown in Figure 3 in the four corners of case 11 to not only provide support for the plates 20 and 21 but to also provide heat insulation between adjacent reservoirs or headers for the heating and cooling media. The channels in each unit are, of course, in open communication with the associated header or reservoir in the parallel feed arrangement shown. Alternatively, suitable baffler could be used to achieve a series flow of the heat exchange medium.

With alternate junctions maintained at a temperature difference so that one junction is relatively hot and the other is relatively cold by circulating heat exchange media through the two paths indicated above, electrical output may be derived from the device by connecting the bottom plate of the stack to the terminal 17 and the top plate of the stack to terminal 18. The connection of the botttom plate to terminal 17 may suitably be made by a wire 32 embedded in the insulating material 30 and connected at the bottom to the bottom plate and at the top to the terminal 17. Connection to terminal 17 and 18 may be made through spring clips or any other well-known device. The above mode of connection of course places each of the units in electrical series circuit relationship and the total output voltage will then be equal to the sum of the output voltages of the total number of units in the device. Alternatively, it will be apparent that the units could be connected in parallel by connecting each of the plates 20 to a conductor such as the conductor 32 and by further connecting each of the plates 21 to a similar conductor disposed in the insulation 29. Conductor 30 would of course still be connected to terminal 17 and the other conductor would be connected to terminal 18.

It will be noted that the device illustrated provides an extremely compact structure in which the heat exchange medium is in direct contact with the materials forming the junction surfaces and thereby assures maximum efficiency of thermal-electric conversion. No auxiliary heat exchanger is needed since the headers are simply a part of the casing for the device whereas the heat exchange channels are formed integrally from the plates constituting the two junctions of the device.

While the principles of the invention have now been made clear, there will be immediately obvious to those skilled in the art many modifications in structure, arrangement, proportions, and the elements and components used in the practice of the invention and otherwise, which are particularly adapted for specific environments and operating requirements without departing from those principles. The appended claims are therefore intended to cover and embrace any such modifications within the limits only of the true spirit and scope of the invention.

I claim as my invention:

1. A thermal electromotive force generator comprising, a first member comprising a first electrically conductive material, said first member having at least one channel recessed in each of two opposed surfaces thereof, second and third members each comprising a second electrically conductive material different from said first material, said second and third members each being positioned to make electrical contact with one of said surfaces of said first member respectively to form first and second junctions therewith and to close the cross sectional perimeters of said channels, means to pass a heating medium through the channel in one of said surfaces, means to pass a cooling medium through the channel in the other of said surfaces, and means to derive an electrical output voltage between said second and third members.

2. A thermal electromotive force generator comprising, a first flat plate comprising a first electrically conductive material, said first plate having at least one channel recessed in each of two opposed flat surfaces thereof, second and third flat plates each comprising a second electrically conductive material different from said first material, said second and third plates each being positioned to make electrical contact with one of said surfaces of said first plate respectively to form first and second junctions therewith and to close the cross sectional perimeters of said channels, means to pass a heating medium through the channel in one of said surfaces, means to pass a cooling medium through the channel in the other of said surfaces, and means to derive an electrical output voltage between said second and third plates.

3. A thermal electromotive force generator comprising, a first flat rectangular plate comprising a first electrically conductive material, said first plate having at least one channel recessed in each of two opposed flat surfaces thereof, second and third flat rectangular plates of the same outline shape as said first plate each comprising a second electrically conductive material different from said first material, said second and third plates each being positioned to make electrical contact with one of said flat surfaces of said first plate respectively to form first and second junctions therewith and to close the cross sectional perimeters of said channels, said channel in one of said surfaces of said first plate being substantially perpendicular to said channel in the other of said surfaces of said first plate, means to pass a heating medium through the channel in one of said surfaces, means to pass a cooling medium through the channel in the other of said surfaces, and means to derive an electrical output voltage between said second and third plates.

4. A thermal electromotive force generator comprising, a first flat rectangular plate comprising a first electrically conductive material, said first plate having a plurality of channels recessed in one major surface thereof parallel to one edge thereof, said first plate also having a plurality of channels recessed in the opposite major surface thereof and disposed perpendicularly to the channels in the other surface thereof, second and third flat rectangular plates each comprising a second electrically conductive material different from said first material, said first plate being positioned in sandwiched relationship between said second and third plates, insulating means supporting said sandwiched plates at the four corners thereof, said second and third plates each being thus positioned to make electrical contact with one of said surfaces of said first plate respectively to form first and second junctions therewith and to close the cross sectional perimeter of said channels, means to pass a heating medium through the channels in one of said surfaces, means to pass a cooling medium through said channels in the other of said surfaces, and means to derive an electrical output voltage between said second and third plates.

5. A thermal electromotive force generator comprising, a stack of electrically conductive members, intermediate ones of said members being composed of a first electrically conductive material and alternate ones of said members being composed of a second electrically conductive material different from said first material, said intermediate members each having at least one channel recessed in each of two opposed surfaces thereof, said alternate members each being contiguous with the adjacent intermediate members to make electrical contact with one of the surfaces thereof to form a junction and to close the cross sectional perimeters of said channels, means to pass a heating medium through the channels in one of said surfaces of each of said intermediate members, means to pass a cooling medium through the channels in the other of said surfaces of each of said intermediate members, and means to derive an electrical output voltage from said stack.

6. A thermal electromotive force generator comprising, a stack of electrically conductive members, intermediate ones of said members comprising a generally flat rectangular plate of a first electrically conductive material, alternate ones of said members comprising generally flat rectangular plates of a second electrically conductive material different from said first material, each of said intermediate members having a plurality of channels recessed in one major surface thereof extending between two opposite edges thereof in a direction generally parallel to a third edge, each of said intermediate plates further having a plurality of channels recessed in the opposite major surface thereof extending between two opposite edges thereof and disposed perpendicularly to the channels in the other surface thereof, said alternate members each being contiguous with the adjacent intermediate members to make electrical contact with one of the surfaces thereof to form a thermo-electric junction and to close the cross sectional perimeter of said channels, said members being disposed in stacked sandwiched relationship in a container of generally rectangular cross section, insulating means attached to said container and supporting said sandwiched plates at the four corners thereof, each of the four sides of said container being flared outwardly to form a manifold chamber adapted to receive a heat transfer medium, the channels in one of said surfaces of said intermediate members being in open communication with two of said chambers and the channels on the other surface of said intermediate members being in open communication with the other two of said chambers, means to pass a heating medium through the channels in one of said surfaces and through the chambers with which said channels communicate, means to pass a cooling medium through the channels in the other of said surfaces and through the chambers with which they communicate, and means to derive an electrical output from the stack of electrically conductive members.

7. A thermal electromotive forces generator comprising, a first member comprising a first electrically conductive material, second and third members each comprising a second electrically conductive material different from said first material, said second and third members each being positioned to make electrical contact with opposed surfaces of said first member respectively to form first and second thermo-electric junctions at the interfaces between said members, at least two of said first, second and third members being shaped to provide two passages for the flow of a heat exchange media through two said members to maintain said two junctions at different temperatures, and means to derive an electrical output voltage between said second and third members.

References Cited in the file of this patent

UNITED STATES PATENTS

| | | |
|---|---|---|
| 641,214 | Matthius | Jan. 9, 1900 |
| 824,684 | Cove | June 26, 1906 |
| 1,120,781 | Altenkinch et al. | Dec. 15, 1914 |
| 2,675,417 | Heibel | Apr. 13, 1954 |

FOREIGN PATENTS

| | | |
|---|---|---|
| 742,364 | France | Dec. 27, 1932 |
| 8,985 | Great Britain | May 1, 1901 |